United States Patent [19]

Mazzullo et al.

[11] Patent Number: 4,717,348

[45] Date of Patent: Jan. 5, 1988

[54] MULTI-OUTLET ELECTRICAL SOCKET BOXES

[75] Inventors: Raymond Mazzullo, Villa Serena, Price Drive, Constantia, Cape Town; Rowland B. Van Zyl, Lakeside, both of South Africa

[73] Assignee: Raymond Mazzullo, Constantia, South Africa

[21] Appl. No.: 908,366

[22] Filed: Sep. 17, 1986

[30] Foreign Application Priority Data

Sep. 20, 1985 [ZA] South Africa ............... 85/7244

[51] Int. Cl.⁴ .................. H01R 9/09; H01R 13/11
[52] U.S. Cl. ........................ 439/76; 439/81; 439/222
[58] Field of Search ......... 339/17 R, 17 C, 17 LM, 339/17 M, 32 R, 32 M, 33, 122 R, 122 F, 123, 258 R, 258 P; 439/76, 81, 222

[56] References Cited

U.S. PATENT DOCUMENTS 3,023,392  2/1962  Lamaudiere .................. 339/33
4,355,853  10/1982  Kourimsky ................ 339/17 R Primary Examiner—Neil Abrams
Attorney, Agent, or Firm—Browdy and Neimark

[57] ABSTRACT

An electrically conductive component is dislosed which comprises a base, two upstanding columns which are spaced apart on the base, and two vertically extending corrugated sections which lie between the columns. One vertical edge of each corrugated section is connected to the adjacent vertical edge of the adjacent column by a hairpin bend. The corrugated sections are spaced apart and define between them a plurality of passages for receiving plug pins of different shapes and sizes. Components of this type are secured to a printed circuit board which is itself clamped between the two parts of a box. One face of the box has apertures therein and the components are aligned with the apertures. When plug pins are pushed into the box through the apertures, they engage with the components. The components are inserted into sleeves which inhibit splaying apart of the columns when the plug pins are inserted. The sleeves have pins which enter holes in the printed circuit board to assist in locating the components on the circuit board and preventing them twisting.

15 Claims, 13 Drawing Figures

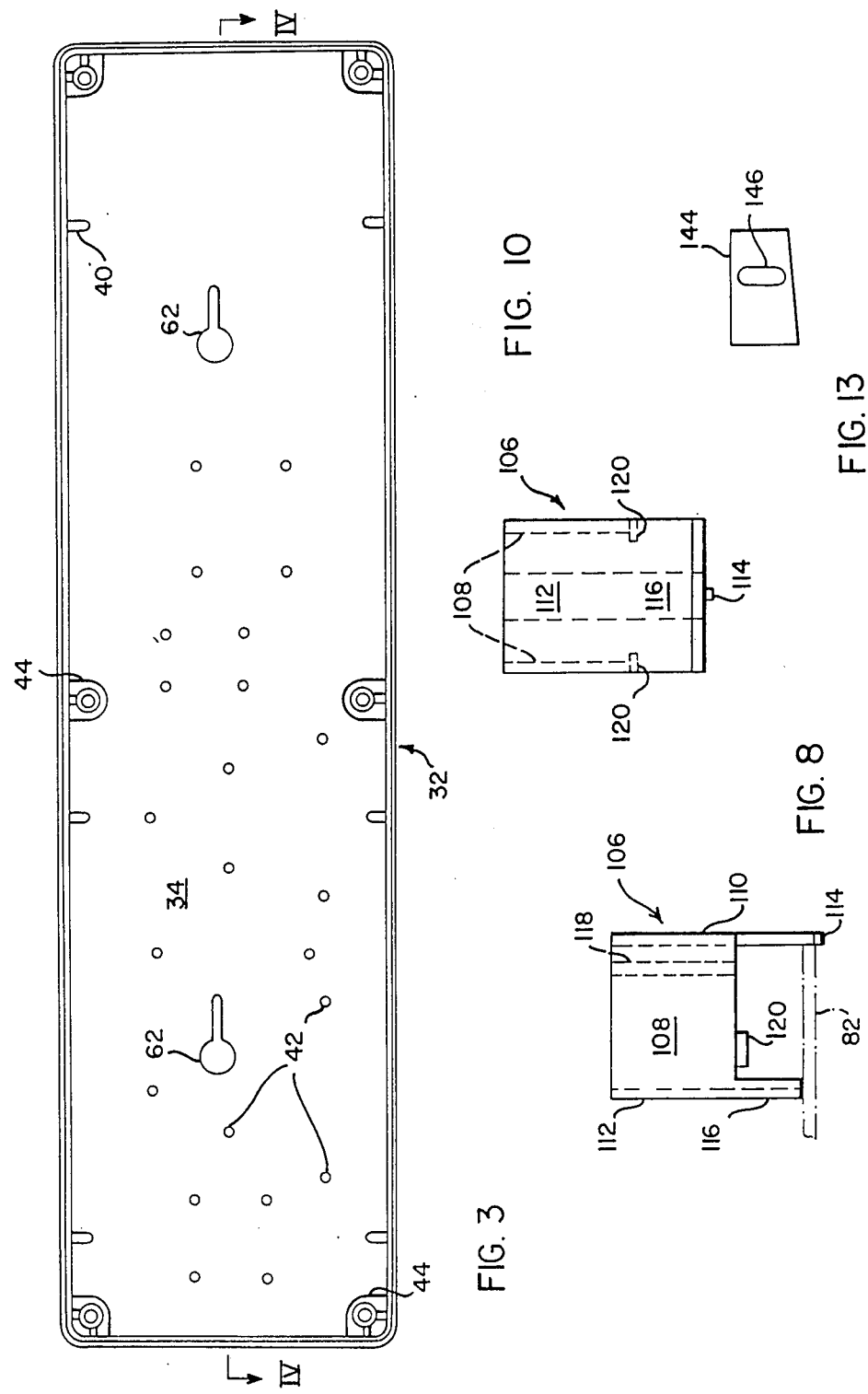

MULTI-OUTLET ELECTRICAL SOCKET BOXES

FIELD OF THE INVENTION

This invention relates to multi-outlet electrical socket boxes.

BACKGROUND TO THE INVENTION

A multitude of electrical plugs are in use worldwide. Some countries use two-pin plugs, others use three pin plugs, and still others use a mixture of two and three pin plugs. Some three pin plugs have their pins arranged in a triangular formation and others have their pins arranged in a straight line. Even insofar as two-pin plugs are concerned, the spacing between the pins varies from country to country, and in some countries round section pins are used and in others rectangular section pins. The problem is further compounded by the large number of voltages in use world wide. For the traveller, this lack of uniformity in electrical plugs and voltages can be a problem particularly now that many pieces of equipment (such as hairdryers and portable electronic equipment) have moulded-on electrical plugs. The traveller can well find himself in a situation where his equipment will simply not plug into the electrical outlets provided. Most travellers resort to purchasing a collection of adaptors which are designed to enable any plug to draw power from any socket through the interposition of one or more adaptors. Quite often the traveller finds himself with all his adaptors plugged one into the other before he can make the electrical connection that he is seeking. This can, in addition to being untidy and potentially hazardous, not necessarily give rise to a sufficiently permanent connection nor the correct voltage for the appliance. The adaptors do not necessarily plug into one another tightly and the merest touch can break the circuit. This is obviously a great disadvantage when a piece of electronic equipment such as a personal computer has been plugged in.

OBJECTS TO THE INVENTION

The main object of the present invention is to provide a multi-outlet electrical socket box which will permit a plurality of electrical plugs to be connected to it without the use of adaptors.

A further object of the present invention is to provide a multi-outlet electrical socket box mounting which enables the multi-outlet electrical socket box to be located in a recess of a wall.

Another object of the invention is to provide a multi-outlet electrical socket box which provides power at different voltages.

SUMMARY OF THE INVENTION

According to one aspect of the present invention there is provided a multi-outlet electrical socket box comprising a two part casing each of which parts has, on the inner face thereof, a plurality of columns, the socket box further including a printed circuit board which is clamped between the columns, the circuit board having electrically conductive components secured thereto in electrical contact with the conductive areas of the board, said components being aligned with apertures in the casing through which apertures the pins of plugs being plugged into the box pass.

Each of said components preferably comprises a base secured to the circuit board, a pair of spaced columns extending from said base at right angles to the circuit board, and a pair of corrugated sections lying between said columns, an edge of each corrugated section which is at right angles to the circuit board being joined to a parallel edge of the adjacent one of said columns by a hair pin bend, said sections partially bounding a number of passages of different dimensions for receiving electrical plug pins, the axes of said passages being normal to the face of the circuit board.

Each of said components can have a sleeve fitted around it, the sleeves being close fits around said columns and inhibiting splaying apart of the columns when plug pins are pushed between said sections.

According to a further aspect of the present invention there is provided an electrically conductive component which comprises a horizontal base for mounting on a printed circuit board, a pair of spaced columns extending upwardly from the base and a pair of corrugated sections lying between said columns, a vertical edge of each section being joined to the vertical edge of the adjacent one of said columns by a hair pin bend, said sections defining between them a number of passages of different dimensions for receiving electrical plug pins, the axes of said passages being vertical.

According to another aspect of the present invention there is provided, in combination, a multi-outlet electrical socket box which includes a front plate and a skirt forming a side wall, the front plate protruding in all directions beyond the skirt and having therein apertures for receiving the pins of electrical plugs;

a rectangular frame which has an opening therein large enough to receive said side wall of the socket box but too small to allow said front plate to pass through it, there being latching means mounted on the rear face of said frame;

a wall box having an upper part which is open at the front for receiving said socket box and a lower part for receiving a transformer, the wall box including a back plate and there being means carried by said back plate of the wall box and a rear plate of said socket box which co-operate so as releasably to secure the wall box and socket box together, and the wall box also including detent means which co-operate with said latching means to releasably secure said frame to the wall box.

Said electrically conductive components can be soldered to the circuit board or secured thereto by rivets and/or eyelets, groups of components forming electrical outlets.

Each of the outlets can have a switch associated therewith or there can be switches which are associated with groups of outlets. The switches can have pins thereof soldered directly to said board. Preferably each switch includes a source of illumination connected to be illuminated when the switch is in the 'on' position. Alternatively, there may be such a source of illumination (e.g. a neon light) separate from each switch.

In one form each outlet is adapted to receive two or three pin plugs with pins of circular cross section. In other forms outlets are adapted to receive two or three pin plugs having pins of rectangular cross-section.

The box can also include means for providing at least two different voltages e.g. 100 to 117 VAC and 220 to 250 VAC.

BRIEF DESCRIPTION OF THE DRAWINGS

For a better understanding of the present invention and to show how the same may be carried into effect, reference will now be made, by way of example, to the accompanying drawings in which:

FIG. 3 is an elevation of the inside of a rear cover of the multi-outlet electrical socket box, FIGS. 8, 9, and 10 are respectively an elevation, an underneath plan view and a further elevation taken at right angles to the elevation of FIG. 8, these Figures showing a sleeve for receiving the component of FIGS. 5, 6 and 7, FIG. 13 is a detail of a latching plate.

DETAILED DESCRIPTION OF THE DRAWING

Figure 1:
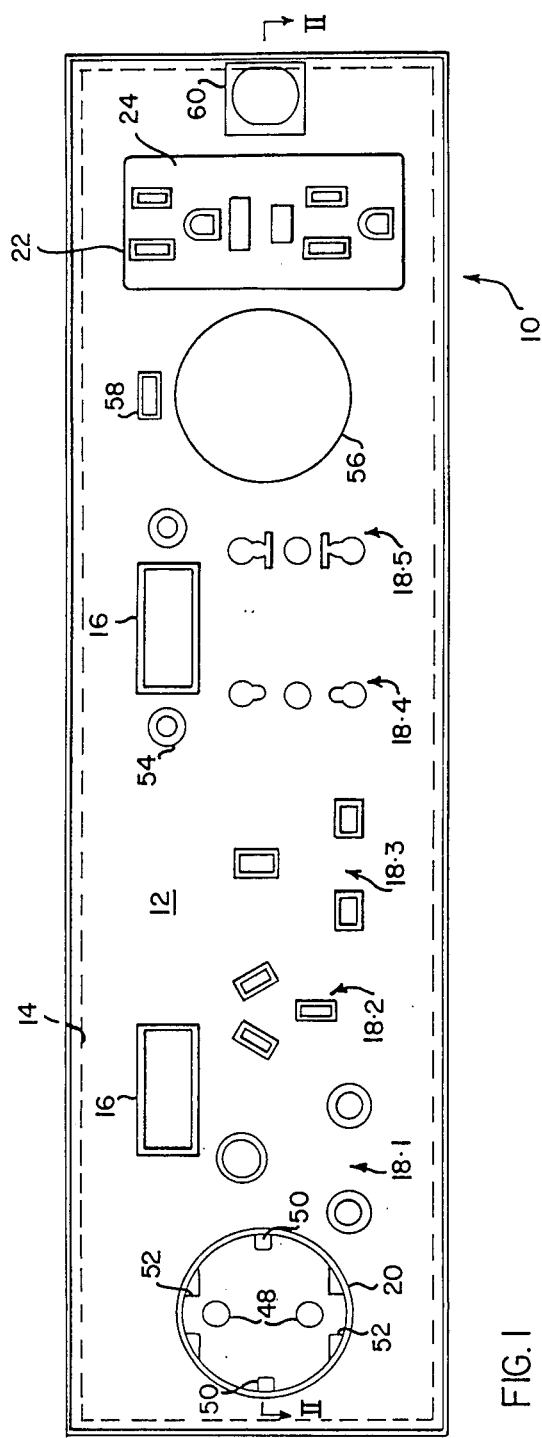
FIG. 1 is a front elevation of the front cover of a multi-outlet electrical socket box.
Figure 2:
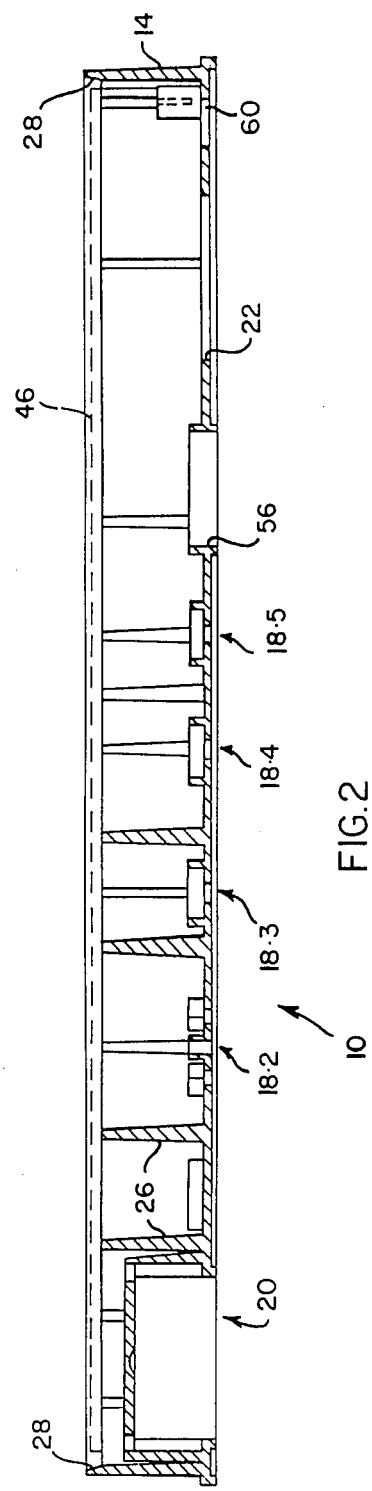
FIG. 2 is a section on the line II—II of FIG. 1.

Referring firstly to FIGS. 1 and 2, the front cover 10 illustrated is moulded in synthetic plastics material and comprises a generally rectangular plate 12 and a peripherally extending skirt 14. The plate 12 is formed with rectangular apertures 16 for receiving switches, groups of apertures 18.1, 18.2, etc. of different shapes for receiving the pins of electrical plugs (not shown), a circular recess 20, and a rectangular aperture 22 in which is received a ground fault circuit interrupter 24. The plate 12 is also formed with further apertures the function of which will be described in more detail hereinafter.

On the rear of the front cover there is a plurality of columns 26 which are distributed over the area thereof. From FIG. 2 it will be seen that there is a groove 28 extending around the inner periphery of the skirt 14 and that the columns 26 extend to the level of the bottom face of the groove 28. Internal ribs 30 are provided for strengthening the skirt 14 and the skirt 14 is, around its entire extent, set back from the edge of the plate 12 so that the plate 12 protrudes in all directions beyond the skirt 14.

Figure 4:
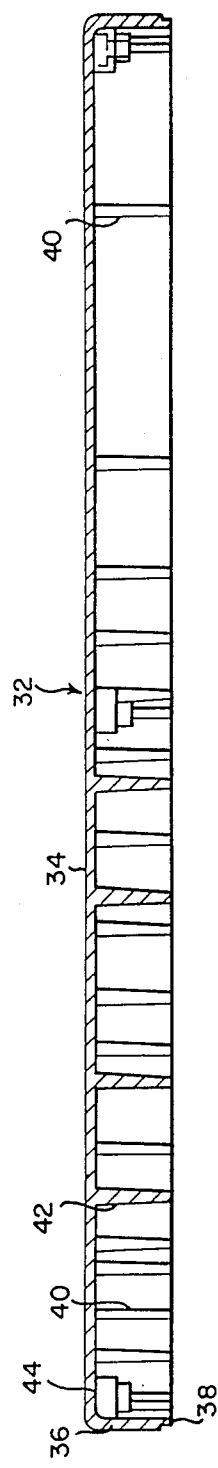
FIG. 4 is a section on the line IV—IV of FIG. 3, FIGS. 5, 6, and 7 are respectively a top plan view, a side elevation and a pictorial view of an electrically conductive component.

Turning now to FIGS. 3 and 4, the rear cover 32 consists of a main plate 34 and a peripheral skirt 36. The skirt 36 is shaped so as to form an upstanding rim 38 (FIG. 4) which is compatible in shape with the groove 28 of the front cover 10. The skirt 36 is strengthened by internal ribs 40. Columns 42 are provided, these being distributed over the area of the rear cover 32 as best seen in FIG. 3. The columns 42 all terminate slightly below the free edge of the rim 38 (see particularly FIG. 4).

At the corners of the covers and mid-way along each side are formations 44 which receive self tapping screws (not shown) and secure the covers 10 and 32 together.

A printed circuit board, shown in outline at 46 in Figure 2, is provided within the casing constituted by the front cover 10 and rear cover 32. The circuit board, after having various components secured thereto as will be described hereinafter, is placed so that it is supported by the columns 26. The casing is then closed by placing the rear cover 32 over the front cover 10 so that the rim 38 of the skirt 36 enters the groove 28. The columns 42 of the cover 32 bear on the circuit board 46 and the circuit board is thus clamped between the sets of columns 26 and 42 so that it is incapable of movement. Where possible, columns 26, 42 are arranged in exact alignment.

The recess 20 has two circular plug pin holes 48 in the base thereof, two earth pin openings 50 also in the base thereof but near the circular wall and two guide grooves 52.

The circular hole 54 receives a light bulb which, when illuminated, shows that the box is connected to a source of power.

The switches in the apertures 16 are two position switches with a single 'off' position and a single 'on' position. The right hand one controls power supply to all the outlets which are supplied with 100v/115v and the other the outlets supplied with 220v/250v. The switches can include illuminated rockers which show whether or not current is being supplied to the groups of outlets.

The circular aperture 56 receives an emergency light and within the socket box there is at least one rechargeable cell and a trickle charger. The light in the aperture 56, powered by the cell or cells, comes on automatically in the event of a power failure. The small opening 58 above the aperture 56 receives a photocell which prevents the emergency light from coming on if the main supply should fail in daylight. Finally, the opening 60 receives a resettable circuit breaker which is connected between the power source and the interupter 24.

For mounting purposes, the main plate 34 of the rear cover 32 has two keyhole slots 62 in it.

Figure 6:
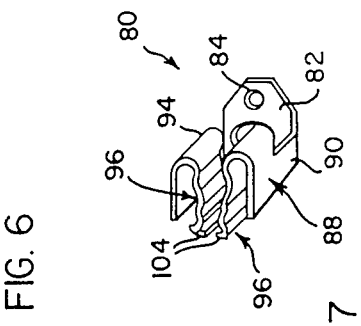
Figure 7:
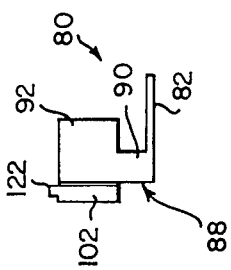
Figure 5:
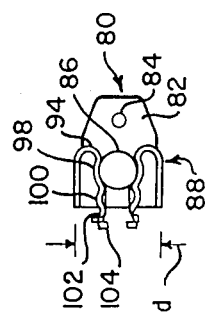

As explained above, there are many two and three pin plugs in use throughout the world. Some two pin plugs have round pins and some have pins of rectangular cross section, and furthermore the spacing between pins varies from plug type to plug type. In addition to the above, there are some three pin plugs where the pins are all on a straight line, and other three pin plugs where the pins are arranged in a triangular array. All these types can be plugged into the socket box illustrated (as will be described in more detail hereinafter) and FIGS. 5, 6 and 7 illustrate an electrically conductive component 80 which, when used in groups and with various layouts, accommodates the most widely used electrical plugs.

The component 80 illustrated is formed from a sheet of electrically conductive material such as brass or copper. It comprises a base 82 which has a small hole 84 and a larger hole 86 therein. Columns 88 extend upwardly from two opposed, parallel edges of the base 82, each column 88 having a narrower lower portion 90 and a wider upper portion 92. Each upper portion 92 merges with a vertically extending hair pin bend 94, the bends themselves merging with laterally spaced corrugated sections 96 which lie between the upper portions 92 of the columns 88 (see FIG. 5).

Each section 96 comprises a first arcuate portion 98 of relatively large diameter, a second arcuate portion 100 of relatively small diameter and a third portion 102 which is generally rectangular in plan view. Each third portion 102 merges with a lip 104, the lips 104 extending towards one another. It will be seen particularly from FIG. 5 that the two portions 98 are co-axial both with one another and with the larger hole 86 in the base 82. The portions 98 thus form a partial periphery for a vertically extending 'cylinder'. The smaller portions 100 also face one another and form a partial boundary for another vertically extending 'cylinder', the diameter of which is smaller than the hole 86. Finally, the third portions 102 face one another so as partially to bound a vertically extending opening of generally rectangular shape.

The columns 88 diverge from one another somewhat in the upward direction.

Figure 9:
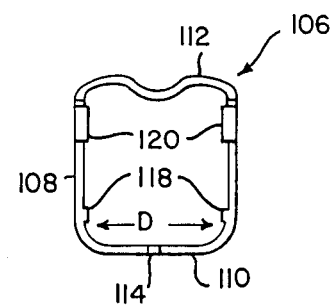

Turning now to FIGS. 8, 9, and 10, these illustrate a sleeve 106 of synthetic plastics material which is intended to fit over the part of the component 80 which consists of the columns 88 and the corrugated sections 96. The sleeve 106, when viewed in plan, is generally rectangular in form and includes a pair of parallel walls 108, a generally straight transverse wall 110 and a second transverse wall 112 which has a corrugated form. The wall 110 extends downwardly below the lower edges of the walls 108 and includes a locating pin 114. The wall 112 also extends downwardly below the walls 108 to form a full width downward extension 116. The wall 110 extends downwardly slightly beyond the extension 116. Ribs 118 extend down the inner faces of the parallel walls 108 and, on the lower edge of each wall 108, there is a locking element 120 which protrudes slightly inwardly of the associated wall 108.

The sleeve 106 is placed, with the extensions of the walls 110, 112 leading, over the component 80 and is pressed down until the extension 116 of the wall 112 encounters the part of the base 82 which is between the holes 84 and 86. The corrugated configuration of the wall 112 ensures that it is clear of both these holes and fits around the hairpin bends 94. As the extension 116 reaches the base 82, the locating elements 120 clear the lower edges of the upper portions 92 of the columns 88 and snap engage beneath them. The sleeve 106 can, because of this inter-engagement, no longer be lifted off the component 80. The height of the wall 112 is equal to the height of the columns 88 and the lower edge of the extension 116 bears on the base 82 when the sleeve 106 is in position. The lower edge of the wall 110 lies in the same plane as the lower face of the base 82 (see FIG. 8) with the pin 114 protruding down below the lower face of the base 82.

The transverse dimension of the sleeve between the ribs 118 (the dimension designated D in FIG. 9), is less than the dimension d in FIG. 5. Thus the ribs 118, as the sleeve 106 is pressed on, urge the columns 88 ( and hence the corrugated section 96) towards one another.

To mount the unit consisting of the component 80 and its fitted sleeve 106, it is presented to the printed circuit board which has a first hole (not shown) which aligns with the small hole 84 and a second hole (not shown) for receiving the pin 114. The base 82 is then secured by a rivet, an eyelet, a screw or nut and bolt passed through the hole 84 to the printed circuit board. The fact that the pin 114 and the eyelet or other fastening form two locating points ensures that the component 80 cannot move with respect to the printed circuit board.

The components 80 are, referring to FIG. 2, mounted on the lower face of the circuit board 46 between the plate 12 and the circuit board. The conductive material of the circuit board is on that face thereof which is closest to the cover 32 and electrical connection from socket to board is made by way of the eyelet, rivet etc which secures the socket to the board.

Those skilled in the art will appreciate that if a second component 80 is placed to the left of that illustrated in Figure 5, then the two arcuate portions 98, the two arcuate portions 100 and the rectangular third portions 102 will be positioned so as to receive two pin plugs of various types e.g. plugs with 3mm circular section pins, plugs with 5 mm circular section pins, and rectangular section flat pins. If three of the components are placed in a triangular array on the circuit board, then they are capable of receiving three pin plugs such as are conventionally used in the United Kingdom and Australia. If reference is again made to FIG. 1, the components 80 behind the group of apertures 18.2 can receive an Australia plug, the components behind the group of apertures 18.3 a United Kingdom plug, the components behind the group of apertures 18.4 continental type two and three pin plugs, and the group 18.5 most of the remaining 'in-line' two and three pin plugs currently in use including the United States two pin plug with rectangular section pins. The group of apertures 18.1 can receive a South African plug, and for this type of plug the components 80 are not used. Instead simple sleeves secured to the circuit board are employed. The interrupter 24 itself includes sockets and can receive two United States three pin plugs.

There is, in extensive use in Germany, a type of plug which has a body of circular cross section. The earth connections of this plug are in the form of diametrically opposed leaf springs which extend along the cylindrical face of the body. It is to receive this type of plug that the plate 12 of the front cover 10 is formed with the circular recess 20. The provision of this recess makes it impossible to fit components 80 between the depressed part of the plate 12 and the circuit board 46. Consequently, the components 80 are, for this plug only, fitted on the other face of the circuit board, and the circuit board is formed with holes which register with the holes 86 in the bases 82. The pins of this specific type of plug pass through the circuit board and the holes 86 and thence between the sections 98.

The upper edges of all three portions 98, 100 and 102 are flared outwardly so as to facilitate entry of the plug pins. The third portion 102 additionally includes upwardly projecting flared lips 122 (see particularly FIG. 6) to prevent an incoming flat pin catching on the upper edges of the portions 102.

Figure 11:
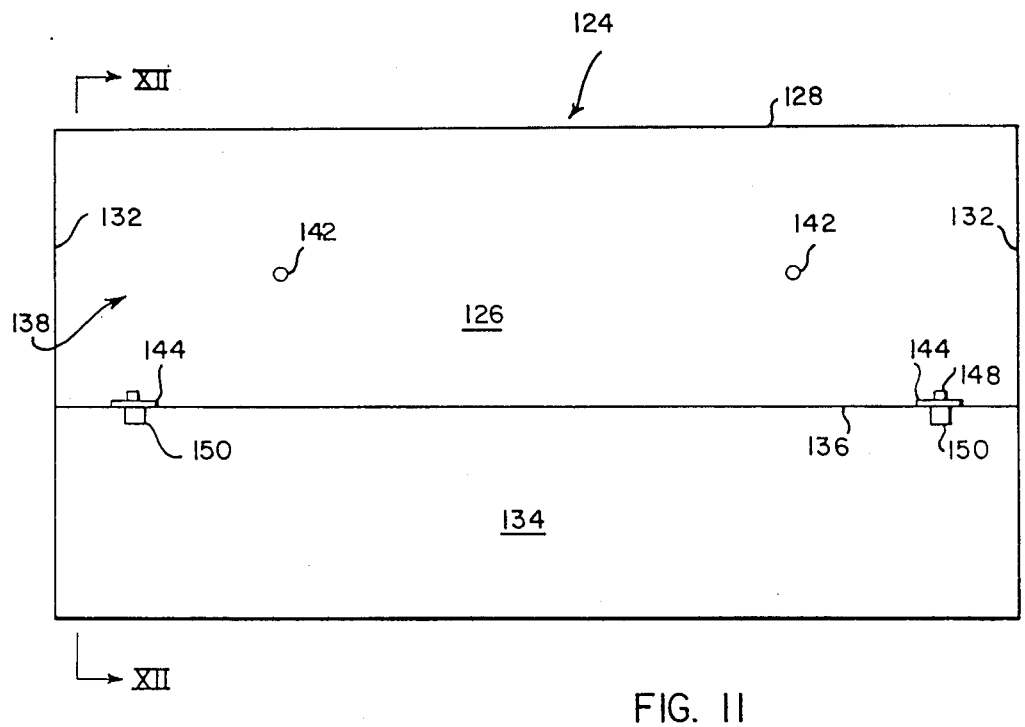
FIG. 11 is a front elevation of a wall box.
Figure 12:
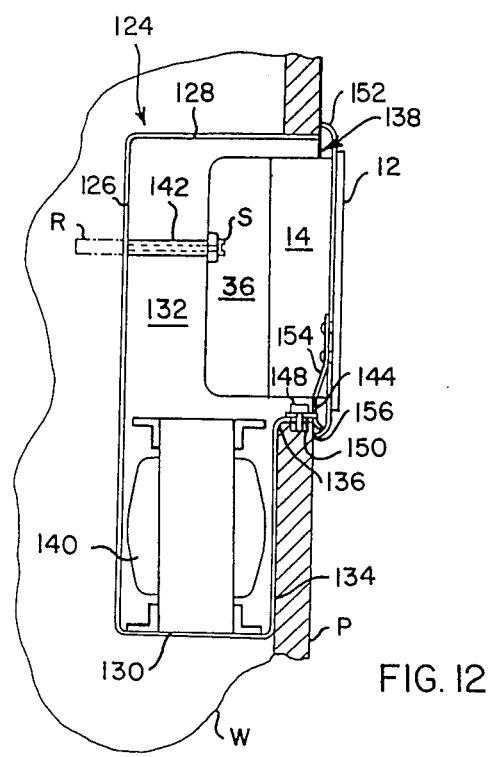
FIG. 12 is a section on the line XII—XII of FIG. 11 and also shows a transformer and other parts.

Turning now to FIGS. 11 to 13, the wall box 124 illustrated comprises a back plate 126, a top wall 128, a bottom wall 130 which is narrower than the top wall 128, two side walls 132 and a front wall 134. The front wall 134 extends upwardly from the front edge of the bottom wall 130 and then turns outwardly to form a horizontal flange 136. Between the front edge of the top wall 128 and the flange 136 there is a rectangular opening 138. The lower part of the wall box 124 contains a transformer 140.

Two hollow headed studs 142 are provided on the inner face of the plate 126.

Two stop plates 144 (see FIG. 13) are mounted on the top face of the flange 136. The plates 144 each have the slightly tapered shape shown and also each have a slot 146. The slots 146 and the flange 136 and into tapped mounting studs 150 welded to the underside of the flange 136. The slots 146 permit a small degree of front to rear adjustment.

Reference numeral 152 (FIG. 12) designates a rectangular frame the outer edges of which are bent over. The opening in the frame 152 is large enough to receive the skirts 14 and 36 but too small to allow the plate 12 to pass through it. Two leaf springs 154 are mounted one on each vertical part of the frame 152, and there are notches 156 in the frame 152 just below each spring 154.

The wall box 124 is intended to be located in a recess provided therefor in a wall W. Rawl plugs R in the wall receive screws S which pass through the studs 142 and secure the box in place. A feeder cable enters the box through an opening (not shown) in one of the walls 132. The box 124 is so positioned that when plaster P is applied to the wall the part of the box which protruded from the wall is plastered in. The studs 150 are embedded in the plaster.

The socket box 10, with the frame 152 around it is, after all the necessary wiring connections between it and the transformer 140 have been made, presented to the opening 138 and pressed back until the frame 152 engages the plaster P. The heads of the studs 142 enter the circular parts of the keyhole slots 62. The box 10 and frame 152 are then moved sideways. This has two results. Firstly the heads of the studs 142 move into the narrow parts of the slots 62 so that the box 10 can no longer be pulled away from the backplate 126. Secondly, the leaf springs 154 bear on the plates 144 and are deflected by them. As the springs 154 clear the plates 144, they snap into locked positions alongside the plates. The socket box is now locked in position and can only be moved again if the springs 154 are bent clear of the plates 144 by an instrument inserted through the notches 156.

We claim

1. An electrically conductive component which comprises a horizontal base for mounting on a printed circuit board, and an upstanding structure comprising a pair of columns which are laterally spaced from one another on said base, the lower ends of which are joined to the base, and which extend upwardly from the base, a pair of spaced apart corrugated sections lying between said columns, and a pair of hairpin bends, a vertical edge of each section being joined to a vertical edge of the adjacent one of said columns by one of said hairpin bends, each section including first and second arcuate portions of different diameters and a third portion which is three sided, the sides of each third portion being generally at right angles to one another, said arcuate portions of said sections facing one another and defining two circular passages of different diameters and said third portions also facing one another and defining a passage of generally rectangular cross section, the axes of said passages being normal to said base, and said base protruding horizontally beyond said upstanding structure and there being a hole in the laterally protruding part of said base.

2. The combination of a component according to claim 1 and a sleeve which is fitted to the component, the sleeve being a close fit around said columns and inhibiting splaying apart of the columns when plug pins are pushed between said sections.

3. An electrically conductive component according to claim 1 and including a further hole in said base which is aligned with the larger one of said passages of circular cross section.

4. An electrically conductive component according to claim 1, in which the parts of the corrugated sections which define the upper ends of the passages flare outwardly so that the passages are, at their upper ends, of larger area than they are over the remainders of their extents thereby to form plug pin lead-in portions.

5. An electrically conductive component according to claim 1, in which part of each corrugated section overlies said base and a remaining part of each corrugated section protrudes horizontally beyond the area occupied by said base, it being the first and second arcuate portions which overlie the base and the third portions which lie outside the area occupieb by the base.

6. An electrically conductive component according to claim 1, in which each of said corrugated sections includes an upwardly extending lip, the lips flaring outwardly with respect to one another and extending upwardly from said third portions, said lips forming lead-in portions for rectangular section plug pins.

7. The combination according to claim 2, in which said sleeve extends laterally beyond said base in one direction and including a pin which protrudes downwardly from the part of the sleeve which extends laterally beyond said base, the pin extending downwardly to below said base.

8. The combination according to claim 2, in which each column is, when viewed in elevation, L-shaped and has a wider upper portion and a narrower lower portion, the wider upper portion of each column having a lower edge, and the sleeve includes locating elements which snap-engage beneath said lower edges as the component is inserted into the sleeve.

9. In combination;
a multi-outlet electrical socket box which includes a front plate and a skirt forming a side wall, the front plate protruding in all directions beyond the skirt and having therein apertures for receiving the pins of electrical plugs;
a rectangular frame which has an opening therein large enough to receive said side wall of the socket box but too small to allow said front plate to pass through it, there being latching means mounted on the rear face of said frame;
a wall box having an upper part which is open at the front for receiving said socket box and a lower part for receiving a transformer, the wall box including a back plate and there being means carried by said back plate of the wall box and a rear plate of said socket box which co-operate so as releasably to secure the wall box and socket box together, and the wall box also including detent means which co-operate with said latching means to releasably secure said frame to the wall box.

10. The combination of claim 9, and including studs and keyhole slots for releasably connecting said boxes together.

11. A multi-outlet electrical socket box comprising a two-part casing each of which parts has, on the inner face thereof, a plurality of columns, the socket box further including a printed circuit board which is clamped between the columns, the circuit board having electrically conductive components secured thereto in electrical contact with conductive areas of the board, said components being aligned with apertures in the casing through which apertures the pins of plugs being plugged into the box pass, the pins when plugged into the box being engaged with said components, and each of said electrically conductive components comprising a horizontal base and an upstanding structure comprising a pair of columns which are laterally spaced from one another on said base, the lower ends of which are joined to the base, and which extend upwardly from the base, a pair of spaced apart corrugated sections lying between said columns of the conductive component, and a pair of hairpin bends, a vertical edge of each section being joined to a vertical edge of the adjacent one of said columns of the conductive component by one of said hairpin bends, each section including first and second arcuate portions of different diameters and a third portion which is three sided, the sides of each third portion being generally at right angles to one another, said arcuate portions of said sections facing one another and defining two circular passages of different diameters and said third portions also facing one another and defining a passage of generally rectangular cross section, the passage being intended to receive differently shaped plug pins, being side-by-side and the axes of said passages being normal to said base, said base protruding horizontally beyond said upstanding structure and there being a hole in the laterally protruding part of said base, a registering hole in the printed circuit board, and a fastening element passing through said registering holes in the base and circuit board and securing the component to the board.

12. A multi-outlet socket box according to claim 11, in which there is a further hole in said base of some of the components, each further hole being aligned with the larger one of said passages of circular cross section, and there being a registering hole in said circuit board.

13. A multi-outlet electrical socket box according to claim 11 and including a sleeve fitted to each of said components, the sleeves being close fits around said columns of the conductive component and inhibiting splaying apart of the columns of the conductive component when plug pins are pushed between said sections.

14. A multi-outlet electrical socket box according to claim 13, in which each sleeve extends laterally beyond said base in one direction and includes a pin which protrudes downwardly from the part of the sleeve which extends laterally beyond said base, the lower end of the pin being below said base of the electrically conductive component, and the circuit board having a hole in it which receives said pin.

15. A multi-outlet electrical socket box according to claim 13, in which each column of the conductive component is, when viewed in elevation, L-shaped and has a wider upper portion and a narrower lower portion, the wider upper portion of each column of the conductive component having a lower edge, and the sleeves include locating elements which snap-engage beneath said lower edges as the components are inserted into the sleeves.

* * * * *